United States Patent Office 3,848,033
Patented Nov. 12, 1974

---

3,848,033
PROCESS FOR PREPARING AGGREGATES
James L. Callahan, Bedford Heights, Arthur F. Miller, Cleveland, and Wilfrid G. Shaw, Lyndhurst, Ohio, assignors to The Standard Oil Company, Cleveland, Ohio
Filed July 13, 1972, Ser. No. 271,387
Int. Cl. B29d 23/00
U.S. Cl. 264—13         9 Claims

ABSTRACT OF THE DISCLOSURE

Hard, rounded aggregates are produced by preparing droplets of a slurry consisting of suspending liquid containing distinct particles of a solid and dropping the droplets of the slurry onto a bed of particles under conditions where the suspending liquid of the slurry droplet is removed. This technique is especially desirable for making unique fixed-bed catalysts.

BACKGROUND OF THE INVENTION

Molten solutions have been frozen by dropping a melt into a bed of small particles, see for example U.S. 3,070,837; U.S. 3,255,036; and U.S. 2,938,233. Such solidification has been carried out with the purpose of coating the pellet formed with the particles in the bed or the incorporation of large quantities of particles of the bed into the final pellet. All these techniques of the art require that the material solidified be molten.

Agglomeration of distinct particles of a solid into an aggregate has been accomplished by many methods. Most common is compaction of the solid and a binder to form a tablet. The present invention prepares aggregates which are as good as or better than those of conventional tableting operations by a totally different method.

SUMMARY OF THE INVENTION

It has now been discovered according to the present invention that aggregates are easily formed by: (a) preparing a slurry, the slurry consisting of at least a suspending liquid and distinct particles of a first solid suspended in said liquid; (b) preparing a particle bed consisting of particles of a second solid; (c) forming droplets of the slurry; and (d) dropping the droplets of the slurry into the particle bed under conditions where the suspending liquid is at least partially removed from the slurry droplet to form an aggregate of the distinct particles of the first solid. Using the process of the present invention, rounded aggregates are formed which are highly attrition resistant. Moreover, in certain applications, the present invention is capable of producing a rounded aggregate having a void center. Those aggregates having a void center and single cavity in the external surface communicating to the void center have been named "amphora." These amphora vary in relation to the shape of the aggregate, but a typical cross-sectional view of an amphora is shown in FIG. 1. These amphora are especially desirable for catalysts because the exposed outer surface of the aggregate is substantially increased as compared to the surface of a pellet prepared by normal compaction techniques.

Slurry

The important aspect of the present invention is the use of a slurry to prepare aggregates. This slurry may vary widely in composition. The slurry consists of at least two components: (1) a suspending liquid; and (2) distinct particles of a suspended solid.

The suspending liquid may be essentially any liquid which will suspend the solid. These liquids, of course, vary widely in nature. Some of the liquids are capable of dissolving large quantities of the solid; whereas, others dissolve little or no solid. Although some liquids are more compatible with the techniques of the present invention, any suspending liquid can be used so long as it can be at least partially removed from the slurry droplet in the process of the invention.

The suspending liquid is removed from the slurry droplet by two basic mechanisms. The first mechanism is that of evaporation of the suspending liquid. This liquid removal mechanism, of course, is directly related to the vapor pressure of the suspending liquid under the conditions of the contact of the slurry droplet with the particle bed.

The second mechanism of removing the suspending liquid from the slurry droplet is that of the capillary action of the particle bed into which the droplet is dropped. Of course, the viability of the capillary action is dependent upon a large number of factors, such as the relationship between the suspending liquid and the particle bed, the porosity of the particle bed and the temperature of the slurry drop. These factors will be considered in greater detail in the discussion of the particle bed and the process of the invention.

In this discussion of the suspending liquid, the most important attribute of the suspending liquid is its vapor pressure when the primary liquid removal mechanism is evaporation. If evaporation is the main mechanism of liquid removal, the suspending liquid is normally one which has a relatively high vapor pressure. On the other hand, if capillary action is the primary mechanism, the vapor pressure of the suspending liquid is relatively unimportant.

Liquids suitable for use as the suspending liquid in the present invention include: water; alcohols, such as methanol, ethanol, butanol and hexanol; ethers, such as methyl ether, ethyl ether and the like; ketones, such as acetone, methyl ethyl ketone, methyl i-butyl ketone and the like; esters, such as methyl acetate, butyl propionate and the like; hydrocarbons, such as hexane, cyclohexane, kerosine and the like; chlorinated hydrocarbons, such as methylene chloride, 1,1,1-trichloroethane, perchloroethylene and the like; aromatic compounds, such as benzene, toluene, chlorobenzene and the like; and any other liquid that is capable of suspending the solid in the slurry. The suspending liquid may be any of these materials individually or any combination or emulsion of liquids.

Normally, less preferred are the liquids having a very low or a very high vapor pressure. These liquids, however, can be employed so long as the liquid can be removed by the interaction of the slurry with the particle bed.

Preferred in the present invention is the use of water as the suspending liquid. This liquid is inexpensive and conveniently removed from the slurry droplet by a number of techniques.

The second component of the slurry is the solid which is suspended in the suspending liquid. For purposes of clarity, this solid is referred to as the first solid. This is the solid that is formed by the process of the present invention into at least part of the aggregate. Accordingly, the description must be rather broad, for it incorporates any material that is agglomerated into an aggregate by the process of the invention.

The first solid may vary widely in composition. It may be a single material, or it may be a combination of two or more solids. The solid material may have many functions in the final aggregate. For example, the solid material may be the active ingredient of the final product, it could be the binder; it could be a porosity improver; it could be an extender; it could be a surfactant; or it could serve any other function.

Any of these solids may be soluble to almost any extent in the suspending liquid, but the total combination of solids and liquid must be a slurry. Preferred slurries contain at least about 5 percent by weight of insoluble solids based on the weight of the suspending liquid under the conditions of droplet formation, with slurries containing at least about 10 percent by weight of insoluble solids being especially preferred. In any particular application, however, the preferred weight of insoluble solids is highly dependent upon the solid agglomerated and the suspending liquid employed in the invention.

The insoluble solids content of a given slurry may be easily determined by forming the slurry with a measured amount of suspending liquid, bringing the slurry to the conditions of droplet formation, allowing the slurry to stand so that the undissolved solids separate from the liquid and decanting and drying the solids in the slurry. Alternatively, the slurry can be centrifuged, a measured amount of a flocculant could be added or the slurry could be filtered to determine the insoluble solids content. The total solids content of the slurry, of course, is the sum of the soluble and insoluble solids of the slurry.

As noted, there is essentially no limit on the type of materials that may be formed into aggregates by the process of the invention. The only criterion that must be met is that there is a liquid in which the solid can be slurried under the conditions of droplet formation.

Broad representative examples of the solids that may be employed in the present invention include: catalyst materials and catalyst precursors; clay; agricultural chemicals, such as urea, ammonium nitrate, herbicides and insecticides; polymers, such as polyethylene, polypropylene, polystyrene, polymethylmethacrylate, and high-nitrile resins; and other materials such as acids, bases, polyurethane intermediates, detergents, metals, metal oxides, metal organic compounds, metal salts, solid organic compounds, pharmaceutical chemicals, food products, carbohydrates and the like. Any of these solids could be used in the process of the invention.

The slurry of the invention may contain other components which are specifically designed to enhance the desirability of the aggregate formed. These components may be dissolved or suspended in the suspending liquid to serve various functions. For example, materials may be suitably included in the slurry as binders, porosity improvers, extenders and the like.

Many of the suspended solids in the slurry can be processed by the present invention to prepare a desirable hard, rounded aggregate. Others, while forming an aggregate, may not possess the desired attrition resistance. Binders can be incorporated into the slurry to rectify this problem. Suitable binders include hydrous oxide gels, such as silica gels and alumina gel, and adhesives such as natural and synthetic resins including rosin, pitch, polyvinyl acetate, phenol-formaldehyde resins and the like. Essentially, any material that increases the cohesiveness of the resulting aggregate may be used.

Porosity improvers can also be added to the slurry. Such porosity improvers are normally materials that are initially incorporated into the structure of the aggregate and then after the aggregate is formed, these improvers are removed by some appropriate technique. For example, a very high boiling liquid which is not removed in the process of the invention may be incorporated into the slurry. When the aggregate is formed, this liquid is entrapped in the solid. The liquid is then removed by calcining the aggregate at a high temperature. The escape of the vapors of the high boiling liquid creates a particle having greater porosity. As a second example, a combustible or decomposable substance can be incorporated into the slurry. Again these particles are entrapped in the aggregate. Their removal by combustion or decomposition gives an aggregate of greater porosity.

A third desired modification of the slurry is the use of extenders. This is the incorporation of materials into the slurry which do not significantly affect the activity of the product in its intended use. For example, when aggregates of an active herbicide are made by the process of the present invention, inert ingredients could be added to protect the desired plants from damage that would result if only the pure herbicide formed the aggregate. Thus, the activity of the herbicide is diluted to an appropriate concentration.

Of course, these are only some of the examples of components of the slurry which are added for a designed purpose. Other ingredients could be added to accomplish other results. For example, a combination of two noninterfering catalytic ingredients could be produced in a single aggregate. These aggregates could be placed in a catalytic reactor, and the reactor could be alternately or concurrently used for two different reactions without changing the catalyst charge.

A preferred application of the invention is its use to prepare catalyst aggregates from active catalyst components or catalyst precursors. The present invention can be used to prepare a strong, attrition-resistant aggregate which is very suitable for fixed-bed catalytic reactions. These aggregates are conveniently made without the complex extrusion or tableting equipment normally required in pelleting operations.

One important application of the invention is the use of the process to prepare catalysts used in oxidation, ammoxidation or oxidative dehydrogenation reactions. Of special significance among these catalysts are those which contain at least the compounds of bismuth and compounds of molybdenum. Thus, in one embodiment of the process of the present invention, the first solid is preferably one which contains at least bismuth and molybdenum. Also preferred because of the desirable catalysts prepared are the catalysts which contain at least iron, bismuth and molybdenum. Thus, in this embodiment, the first solid is preferably one which contains at least the compounds of these three metals.

Even though the nature of the solid suspended is not critical, the size of the suspended solid in the slurry is important. The suspended solid must be of such a size that droplets of the appropriate size may be formed. Of course, this means that the size of the particle permissible in the slurry is a direct function of the size of the droplet to be formed. If the size of the droplet is small, the particles of solid in the slurry must be small enough to accommodate the droplet. With larger droplets, larger particles of the suspended solid can be tolerated.

In the present invention, the best results are normally obtained by using a suspended solid in the slurry with a particle size of less than about a millimeter, with those having a particle size of less than about 0.2 millimeter being of special interest because of the desirable aggregate formed. The significant advantage of smaller particles is that the resulting aggregate tends to be more cohesive.

In the slurry, the suspended particles are discrete entities. They are spatially separated throughout the slurry by the suspending liquid. In the process of the invention, these separate and distinct particles are agglomerated into an aggregate without the use of compaction techniques associated with tableting operations.

The concentration and density of this slurry may vary widely. It may be extremely concentrated having a high solids concentration, or it may be rather dilute. In either instance, the present invention can be applied to produce aggregates from the slurry. In the preferred practice of the present invention, the slurry of the invention has a high solids content. This high solids concentration reduces the liquid removal load on the particle bed into which the slurry is dropped.

One of the most important variables with respect to the shape of the aggregate obtained is the apparent viscosity of the slurry. As a broad rule, it has been discovered in our experiments that as the apparent viscosity of the slurry is increased, the spherical nature of the aggregate formed is increased. In the practice of the invention, it has been found that the preferred range of apparent viscosities is about 400 to about 15,000 centipoise. Of course, this preferred range of viscosities may vary as different solids and suspending liquids are employed.

In the practice of the invention using water as a suspending agent, the slurry normally has a specific gravity of about 1.1 to about 3. For slurries using other suspending liquids, these figures can be extrapolated to give a figure which should be the characteristic specific gravity for other slurries.

Particle Bed

In addition to the slurry, the present invention utilizes a particle bed. This particle bed is composed of particles of a second solid which may be chemically the same or different from the first solid. The particle bed may vary widely in terms of composition and particle size.

The particle bed may be composed of particles of any chemical composition. Normally, the particles of the particle bed are not substantially incorporated into or permanently deposited on the aggregates formed. Thus, inexpensive, inert materials, such as sand, clay, alumina, carbon, sugar, diatomaceous earth and the like, can be employed as the compositions for the particle bed. In a preferred practice of the invention, however, the solid of the slurry is similar in chemical composition to the solid of the particle bed. In the description of the invention, this means that the first solid and the second solid are chemically similar.

Although the particle bed may be composed of particles of any chemical composition, the nature of the particles plays a significant role in the removal of the suspending liquid. The nature of the particles is central when the suspending liquid is removed from the slurry by means of capillary action as described above.

In this capillary action, the droplet dropped into the particle bed interacts with the particle bed in such a manner that the suspending liquid is drawn out of the droplet. It has been noted that this capillary action is improved when particles having an increased porosity are employed. Accordingly, as the porosity of the solid in the particle bed is increased, the capillary action as a general rule increases. For example, in parallel experiments, using a particle bed of small glass beads which have a very low porosity and a second particle bed of a porous carbon, the capillary action noted (i.e. the rate of liquid removal and attendant rigidification) with the carbon particle bed is substantially greater than the glass-bead particle bed. Thus, if liquid removal by means of capillary action is contemplated, care should be taken to assure that the particle bed contains a solid of the desired porosity.

A second important aspect of the nature of the second solid which is used to make the particle bed is its relationship with the slurry. The particle bed may be repulsed or attracted to the slurry. For example, an aqueous slurry dropped into a hydrophobic particle bed would be repulsed by the bed and would produce a significantly different shaped aggregate than would be produced by a neutral or a hydrophilic particle bed. Thus, the interaction between the particle bed and the slurry droplets can be varied to vary the shape of the aggregate formed.

The basic feature of the particle bed is its ability to accept and at least partially encompass the droplets of the slurry without completely destroying the shape of the droplet. To illustrate this phenomenon, consider the dropping of a droplet of slurry on a flat, solid surface. The droplet shape is completely distorted upon impact with the solid surface. The particle bed in the invention must be of such a nature that these droplets are not distorted in this manner. This protection of the droplets is accomplished in essentially two ways: (1) reducing the size of the particle in the bed and (2) controlling the density of the bed.

Of course, it is readily apparent that the size of the particles in the bed has a significant impact on the shape of the droplet. Broadly, the size permissible is dependent upon a number of factors of the preparation, such as the composition of the slurry, the apparent viscosity of the slurry, the nature of the particles in the particle bed, the temperature of the bed and the desired shape of the final aggregate. The parameters on these factors can be altered until the appropriate aggregate is obtained. Generally, as smaller particles are used in the particle bed, the aggregates formed have more of a spherical shape. Also, as the density or apparent viscosity of the slurry is increased, the effect of the size of the particle on the final aggregate is reduced.

In the preferred practice of the present invention, it has been observed that the size of the particles in the particle bed is preferably maintained below about 500 microns, with sizes between about 1 and about 200 microns being preferred.

The density of the particle bed at the time of the impact of the slurry droplet also has a significant effect on the shape of the aggregate formed in the process of the present invention. A lower density particle bed creates less impact of the droplets on the bed, and thus, the distortion of the droplet shape is reduced. The lower density is readily obtained by using a low density solid or by fluffing or fluidizing a higher density solid. Fluidizing a solid has an additional benefit in that the heat transfer characteristics of the particle bed are improved. Thus, the removal of the suspending liquid from the slurry is normally enhanced by using a fluidized particle bed even though other changes occur.

Process of Invention

In the practice of the invention, the slurry described is formed into droplets, and the slurry droplets are dropped into the particle bed described. This is accomplished by techniques that are generally known. The particular way in which these procedures are carried out is not the point of the broad concept of the present invention. The preparation of amphora, however, utilizes special techniques of the present invention.

The droplets of slurry can be formed by a number of known techniques. Devices as simple as a medicine dropper are conveniently used to prepare suitable aggregates. Of course, in a commercial operation, a device forming a plurality of droplets at one time would normally be necessary.

The size of the aggregates formed is directly proportional to the size of the droplet. As the size of the slurry droplet is increased, the size of the aggregate is increased. Using essentially uniform droplets under a given set of operating conditions, yields of substantially uniform aggregate are obtained.

The slurry droplets are usually introduced to the particle bed by means of a gravity drop to an essentially perpendicular particle bed. The droplets, however, may be introduced to the particle bed by other techniques, such as propelling the slurry droplets or dropping the droplets in a strong countercurrent flow of gas. These and other methods of dropping the slurry can be used to increase or decrease the impact of the slurry droplet on the particle bed. For example, the particle bed could have a reciprocating motion with respect to the source of the slurry droplets. When the slurry droplet impacts on the particle bed as the particle bed is moving away from the droplet source, the force of the impact of the droplet on the bed is reduced. On the other hand, if the particle bed is moving toward the droplet source, the force of the impact is increased.

In the present invention, the path of the droplets need not be perpendicular to the bed. The droplets can be dropped on the particle bed at any angle or even propelled across the surface of the particle bed. Any of these techniques could be employed and are encompassed by the term "dropping" as used herein.

Of course, in the practice of the process of the invention, the nature of the slurry and the nature of the particle bed play a preeminent role in the shape of the aggregate formed. Yet, other factors, such as drop height, movement of the bed after droplet impact and temperature, also play important roles.

The drop height may vary widely and is dependent largely upon the shape of aggregate desired. With a short drop height, a thick slurry and a low-density, finely-divided particle bed, an almost perfectly spherical aggregate can be obtained. Generally, as the drop height is increased, the distortion from a spherical shape is more pronounced. The drop height may vary from as small as a fraction of an inch to a height of several feet or more.

Movement of the particle bed may be desirable. One basic goal in imparting movement to the particle bed is to continuously expose fresh solid of the particle bed to the slurry droplets. This tends to maximize the suspending liquid removal and to reduce the possibility of forming "Siamese twin" aggregates. This movement may be of essentially two types: (1) movement with respect to the path of slurry drop which entails little or no mixing of the particles; and (2) mixing of the particles.

The movement of the particle bed without mixing of the particles in the bed is conveniently accomplished by placing the solid of the particle bed on a conveyor belt and moving the belt in an essentially perpendicular plane to the path of the slurry droplet. This moves fresh solid of the particle bed continuously into the droplet target area while little or no mixing of the solid in the particle bed is experienced. An alternative to moving the bed is moving the source of the droplets in such a manner that the droplets fall on fresh solid of the particle bed. Either of these techniques can be beneficially applied to the preparation of amphora.

The second method of imparting movement to the particle bed is a mixing of the solid within the bed. This movement is conveniently accomplished by agitation, fluffing, fluidization, stirring, mixing, blending or continuous removal and make-up of particles in the dropping zone. Such movement is normally conducted during and after droplets are dropped into the particle bed. This movement does not have a desirable effect on the preparation of amphora.

As a unified process, the slurry, particle bed and drop conditions are chosen to give the desired rate of rigidification. One important variable in the conditions is the temperature. Although the slurry drop can be conducted at any temperature, the rate of rigidification is generally increased as the temperature is increased. As discussed in relation to the suspending liquid and particle bed, the rate of rigidification would also increase with the increasing vapor pressure of the suspending liquid and the increasing porosity of the solid in the particle bed.

In the process of the invention, the discrete particles of solid in the droplets of slurry are agglomerated to form an aggregate. These aggregates as they are formed may, in some cases, have a thin coating of the solid which forms the particle bed. This coating in most cases is easily removed by agitation, such as mild vibration of the aggregates on a screen. In cases where a more adherent coating is formed, other techniques of solid removal can be conveniently applied.

The nature of the aggregates formed in the present invention vary substantially as the components of the slurry are altered. It is possible, however, to produce very coherent, attrition-resistant aggregates by the process of the invention. These aggregates are especially useful in fixed-bed catalytic reactors because of their spherical shape and stability.

One of the amazing features of the invention is the ability of the process of the invention to make aggregates having a void center. Although these aggregates are generally amphora (i.e. they have a single cavity in the external surface communicating to the void center), aggregates without a communicating cavity are prepared using amphora techniques. These aggregates with a void center are especially desirable for catalysts because the exposed surface is substantially increased as compared to normal tablets, and problems of diffusion of reactants and products through the catalyst are significantly reduced. Although the exact mechanism by which these amphora are made is not known, they can be produced by a relatively simple process. In this preparation, the droplets of a slurry having a viscosity in the lower half of our preferred range are formed and dropped onto a static powder bed in such manner that the total droplet is not immersed in the powder. Without agitation, the droplet is allowed to dry in the particle bed. Surprisingly, the predominant product formed is a rounded aggregate having a single cavity in the external surface communicating to a void center. Also produced in this process are some aggregates that have a void center and no communicating cavity from the external surface.

Whether amphora or other aggregates are prepared by use of the present invention, the invention provides a very suitable technique for agglomerating distinct particles into a cohesive aggregate without the use of compaction techniques.

DESCRIPTION OF THE DRAWING

Referring to FIG. 2, there is a powder feed reservoir 1, a slurry feed reservoir 2, equipped with a stirrer 3, a dryer 4, moving belt 5 which is an an essentially solid belt, moving screen 6 which is such a mesh screen so that the aggregates are retained on the screen while the powder falls through the screen, powder hopper 7 and aggregate hopper 8.

Figure 1:
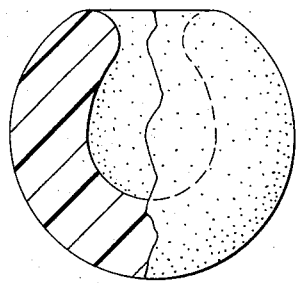
FIG. 1 shows a half-section view of a typical amphora which is an aggregate having a single cavity in the external surface communicating to a void center. These amphora can be manufactured by the process of the present invention and vary widely in shape and size according to the process employed.
Figure 2:
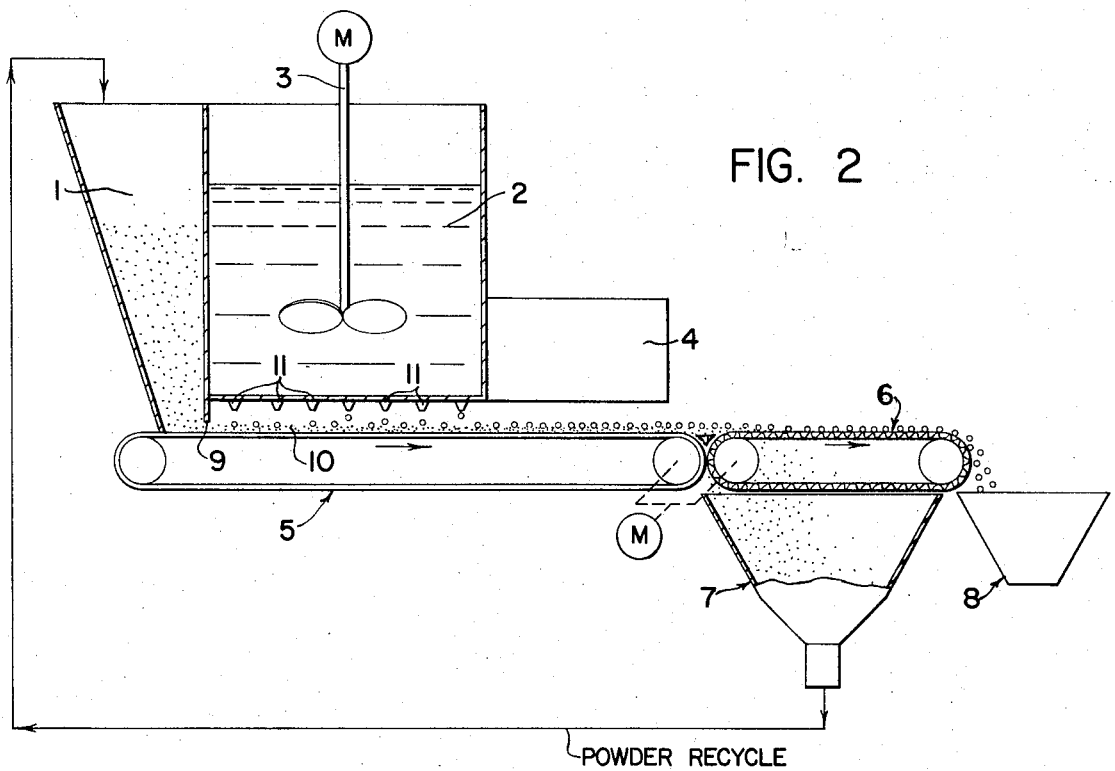
FIG. 2 shows an apparatus which can be used to manufacture the aggregates of the invention.

In the operation of the apparatus, a quantity of small particles of the solid into which the slurry is to be dropped is placed into the powder feed reservoir. By gravity action, this powder is fed onto mixing belt 5. The powder is evenly distributed over the belt by leveling edge 9 in such a manner that a level, substantially-uniform powder bed 10 is obtained on moving belt 5.

The slurry feed reservoir 2 is charged with the slurry to be dropped. The suspension of the particles in the slurry as discrete entities is maintained by stirring from stirrer 3. The slurry is fed through a plurality of droplet outlets 11 where distinct droplets of slurry are formed and allowed to drop by gravity onto the powder bed, 10. The droplets are dropped from a height such that the droplets are not totally immersed in the powder bed 10.

The droplets in the powder bed 10 are transferred by the movement of moving belt 5 to a drying zone wherein the droplets are dried by dryer 4. The temperature and conditions of this drying zone may vary widely and are dependent upon the desired nature of the final aggregate.

From the drying zone, the dried aggregates are then transferred in powder bed 10 by means of moving belt 5 to a moving screen 6. The spacing of the screen is such that the powder, into which the droplets are dropped, readily falls through the screen and is caught in powder collector 7. From powder collector 7 the powder is conveniently recycled to the powder feed 1. During the recycle, not shown, the powder could be regenerated for use by some appropriate technique, such as drying.

The moving screen 6 has a spacing such that the aggregates produced by the technique of the present invention do not pass through the screen. Thus, a separation of the powder and aggregates of the invention is effected. The aggregates produced are then transferred to the aggregate collector 8 where the aggregates are collected and stored for further use. If necessary, moving screen 6 can optionally be vibrated to agitate the aggregates in such a manner that essentially all powder from powder bed 10 is removed from the aggregate.

SPECIFIC EMBODIMENTS

Examples 1–14.—Preparation of aggregates using various techniques

Aggregates of the invention were prepared by mixing 10 parts of a uncalcined catalytic metal oxide having the emperical formula $K_{0.1}Ni_{2.5}Co_{4.5}Fe_3BiP_{0.5}Mo_{12}O_x$ and 3 parts of silica added as a 40% ammonia stabilized silica sol. When the mixture was homogeneous, it was allowed to gel and stand for 20 hours. The hydrogel formed plus a small amount of water were mixed together in the blender. As the time spent in the blender increased, the viscosity of the gel decreased. Samples were taken at various time intervals and used in the process of the invention. The viscosity of the samples can be maintained by lowering the pH of the mixture.

Samples of the slurry were dispersed through a medicine dropper. The particle bed contained a solid of essentially the same composition as the solid suspended in the slurry. The particle size was a rather random distribution of particles in the range cited in Table I. The particle bed was a static bed maintained at room temperature, the drop height, viscosity of the slurry, particle size of the bed and description of the aggregate formed are shown in Table I. All aggregates formed were approximately 4 mm. in diameter.

In the process, the slurry was dropped from the medicine dropper onto the static bed and allowed to rest on the surface of the static bed for a few minutes. The particle bed was then shaken to completely cover the partially-hardened slurry droplet, and the aggregate was allowed to dry for a few minutes. The aggregates were retrieved from the particle bed and dried in an oven. Any surface dust on the aggregate was then removed by a slight vibration of the oven-dried aggregate. The descriptions of these aggregates are shown in Table I. Spherical describes those experiments where the product obtained was visually observed to contain a predominance of substantially spherical aggregates. Semispherical describes those experiments where the product obtained was visually observed to contain a predominance of distorted spherical aggregates. All aggregates formed were very attrition resistant.

TABLE I
[Aggregates prepared using various techniques]

| Example | Drop height, inches | Viscosity, cp. | Particle size of bed, μ | Description of aggregate |
|---|---|---|---|---|
| 1 | 1 | 520 | <149 | Semispherical amphora. |
| 2 | 10 | 520 | <149 | Semiflat amphora. |
| 3 | 1 | 1,140 | <149 | Semispherical amphora. |
| 4 | 1 | 2,100 | <149 | Do. |
| 5 | 1 | 2,100 | <44 | Spherical dimpled. |
| 6 | 1 | 4,580 | <149 | Spherical. |
| 7 | 1 | 6,370 | <149 | Do. |
| 8 | 1 | 10,300 | <149 | Do. |
| 9 | 1 | 680 | <44 | Spherical amphora. |
| 10 | 1 | 680 | <149 | Semispherical amphora. |
| 11 | 1 | 680 | >88<149 | Do. |
| 12 | 1 | 680 | <44 | Spherical dimpled, bed temperature 100° C. |
| 13 | 2 | 680 | <149 | Less spherical than Ex. 9. |
| 14 | 4 | 680 | <149 | Flatter than 12, larger opening in amphora. |

Examples 15–20.—Preparation of aggregates of various composition

In the same manner as shown by the examples above, aggregates of various compositions were prepared by making the slurries with the components shown in Table II, adding enough water to obtain a viscosity of roughly 3000 centipoise by visual observations, and dropping the slurry at a drop height of about 1 inch into a static bed of a fluorocarbon support sold under the trade name Fluoropak 80 by the Fluorocarbon Company. The aggregates formed in these experiments are described in Table II.

TABLE II
[Preparation of aggregates of various compositions]

| Example | Slurry composition | Description of aggregate |
|---|---|---|
| 15 | Aqueous emulsion of polybutadiene containing 65% solids. | Spherical. |
| 16 | Aqueous emulsion of copolymer of acrylonitrile and methacrylic acid containing 29.9% solids. | Do. |
| 17 | 6.5 g. cobalt molybdate on alumina, 6.5 g. 40% silica sol. | Do. |
| 18 | 3.5 g. cobalt molybdate on alumina, 3.5 g. dispersible alumina. | Do. |
| 19 | 8.0 g. 0.5% Pd on molecular sieve, 3.5 g. 40% silica sol. | Do. |
| 20 | 3.5 g. NiO on silica alumina, 3.0 g. 40% silica sol. | Do. |

Examples 21–30.—Preparation of aggregates using different particle beds

In the same manner as shown by the examples above, a slurry was prepared using equal parts by weight of pulverized 20% cobalt molybdate on alumina and dispersible alumina sold as Dispal M by Continental Oil Company. To these dry ingredients enough water was added to obtain a slurry having a viscosity of roughly 3000 centipoise by visual observation of the consistency of the mixture. From a drop height of about 1 inch, this slurry was dropped into various particle beds of fine mesh to determine the effect of the particle bed upon the aggregate formed. The aggregates were dried at 130° C. The description of the dried aggregates and the particle beds are shown in Table III.

TABLE III
[Effect of the use of different particle beds]

| Example | Particle bed | Aggregate formed |
|---|---|---|
| 21 | Silica gel | Spherical. |
| 22 | Fluorocarbon sold as Fluoropak 80 | Do. |
| 23 | Aluminum oxide | Semispherical. |
| 24 | Pulverized active carbon | Spherical. |
| 25 | Calcined alumina 325 mesh | Do. |
| 26 | Fullers earth | Do. |
| 27 | Wood flour | Do. |
| 28 | Fluorinated graphite | Do. |
| 29 | Microspheroidal mixed metal oxides | Do. |
| 30 | Glass microbeads, 60–80 mesh | Semispherical. |

Examples 31–46.—Aggregates prepared from various slurries and various particle beds Using the procedures described above, various slurries of different composition were dropped from a drop height of about 1 inch into various particle beds. Unless specified, the slurries were prepared by mixing the suspending liquid and solid until a slurry of the desired consistency, roughly a viscosity of 3000 centipoise, was obtained. The composition of the slurries, the composition of the particle beds and the description of the aggregate formed are found in Table IV. Some of the aggregates were observed to bear a coating of the solid from the particle bed.

TABLE IV

[Aggregates prepared from various slurries and various particle beds]

| Ex. | Slurry | Particle bed | Aggregate |
|---|---|---|---|
| 31 | Aq. urea | Powdered pumice | Spherical, amphora. |
| 32 | Aq. NH₄NO₃ | Powdered NH₄NO₃ | Spherical. |
| 33 | Aq. pulverized potato chips | Pulverized NaCl | Do. |
| 34 | Aq. ground animal crackers | Powdered sugar | Do. |
| 35 | Aq. ground corn flakes | do | Do. |
| 36 | do | Pulverized corn flakes | Do. |
| 37 | Aq. alumina gel | Alumina, 80-200 mesh | Semispherical |
| 38 | 10 g. alumina, 4 g. H₂O, 6.5 g. 40% silica sol. | do | Spherical. |
| 39 | 5 g. bismuth phosphomolybdate, 2 g. H₂O, 5.0 g. 40% silica sol. | Powdered bismuth phosphomolybdate. | Do. |
| 40 | 5 g. TiO₂, 3 g. H₂O | TiO₂, 80-200 mesh | Semispherical. |
| 41 | 5 g. TiO₂, 1.5 g. H₂O, 1 g. 40% silica sol. | do | Do. |
| 42 | 1 g. active carbon, 1.25 g. glycerine, 2.0 g. H₂O. | Active carbon, <200 mesh. | Spherical.* |
| 43 | 1 g. active carbon, 1.25 40% silica sol, 2 g. H₂O. | Active carbon, <200 mesh. | Spherical. |
| 44 | 1 g. active carbon, 2 g. light oil. | do | Do. |
| 45 | 25 g. urea, 3 g. (NH₄)₂SO₄, 1 g. NH₄NO₃, 6 g. H₂O. | Powdered bentonite clay. | Do. |
| 46 | Aq. (NH₄)₂SO₄ | Fine beads of polystyrene sold as Porapak®. | Do. |

* Easily broken in normal handling.

Examples 47-52.—Effect of movement of the particle bed

The slurry of Example 1 having a viscosity of 3000 centipoise was pumped to a multi-orifice dropper. The droplets were dropped onto a particle bed having a solid of essentially the same composition as that of the solid in the slurry and having a particle size distribution less than 149μ. The effect of movement in the bed was observed in relation to the shape of the aggregates formed. The conditions of these experiments and results are given in Table V. The fluffed bed was provided by rotating the particle bed on an inclined plane in such a manner that a fluffy powder was formed. This fluffy powder was then allowed to remain static for the dropping. For the static bed, there as no attempt to fluff the particle bed. For the fluid bed, a stream of air was passed through the particle bed in such a manner that the volume of the bed was expanded to 120% of the original volume when no air was passed through the bed. The slow-moving bed was a static bed placed on a moving belt.

TABLE V

[Effect of movement in the particle bed]

| Ex. | Particle bed | Additional bed movement after drop | Aggregate shape | Percent amphora |
|---|---|---|---|---|
| 47 | Static | None for 5 min | Semispherical | 100 |
| 48 | Fluffed | do | Spherical | 100 |
| 49 | do | Continuous mild move and solid addition. | do | 60 |
| 50 | Slow moving | None for 5 min | Semispherical | 100 |
| 51 | do | Continuous addition of new solid on top of droplets. | do | 15 |
| 52 | Fluidized | Continuous fluidization. | Spherical | <5 |

Examples 53-67.—Altering the properties of the aggregates by the addition of ingredients to the slurry In the same manner as shown in Example 1, slurries were prepared and dropped into a static bed. The slurries of these examples, however, are different in that they contained various additives to cause alteration in the properties of the aggregates formed. The additives were added to a slurry consisting of 750 g. of the mixed uncalcined metal oxides, 193 g. of 40% silica sol and 225 g. H₂O. After dropping, the aggregates were air dried for 30 minutes at room temperature, dried at 120° C. for two hours and heated in air at 290° C. for one hour, 425° C. for one hour and calcined at 620° C. The pore volume was calculated from helium, mercury pycnometer measurements and the apparent bulk density. The effect of the additives on the pore volume of the aggregates is shown as compared to Example 67 where nothing was added.

TABLE VI

[Effect of additives on aggregates]

| Example | Additive | Wt. percent | Pore volume, cc./g. |
|---|---|---|---|
| 53 | Graphite | 5 | 0.245 |
| 54 | Carbon black | 10 | 0.430 |
| 55 | Ethyl cellulose | 20 | 0.436 |
| 56 | Polybutadiene | 5 | 0.288 |
| 57 | do | 20 | 0.451 |
| 58 | Copolymer of acrylonitrile and methacrylic acid emulsion. | 5 | 0.287 |
| 59 | Solid copolymer of Ex. 58 | 5 | 0.309 |
| 60 | NH₄NO₃ | 10 | 0.223 |
| 61 | Hard wax emulsion | 10 | 0.458 |
| 62 | Stearic acid | 10 | 0.332 |
| 63 | Polyacrylonitrile | 5 | 0.327 |
| 64 | Oat cereal | 10 | 0.420 |
| 65 | do | 35 | 0.565 |
| 66 | Dioctysulfosuccinate | 2 | 0.250 |
| 67 | None | | 0.222 |

Using the techniques of the invention discussed above, the present invention could be used to alleviate various problems of aggregation and capitalize on opportunities such as those discussed below.

Iron oxide powder emanating from smelting operations is entrapped in water to form a dense slurry. Coal tar is added to the slurry as a binder, the slurry is formed into droplets and the droplets are contacted with a bed of small iron metal particles. Rounded aggregates of iron oxide are formed which can be sold or recycled.

From an electrostatic trap on the flue of a coal-fired boiler, large accumulations of fly ash are removed. The fly ash is suspended in water and molasses is added to the slurry as a binder and rounded aggregates are prepared by contacting droplets of this slurry with a fluid bed of carbon particles.

An aqueous slurry of aspirin crystals, starch and a surfactant is formed into droplets and dropped into a powdered fluffed bed of small aspirin crystals. A round aspirin aggregate is obtained.

Urea is slurried in chloroform, droplets are formed from the slurry and the droplets are contacted with a moving powdered bed of small alumina particles.

Sodium hydroxide granules are slurried with water or acetone. The slurry is formed into large droplets, and the droplets are contacted with a fluid bed of sodium hydroxide granules. Rounded agglomerates of sodium hydroxide ⅜" in diameter are formed. As a modification of the above technique, a small amount of a surfactant is added to the sodium hydroxide slurry to enhance the solubility of the final aggregate product.

Fine particles of a melamine resin are suspended in water and droplets of the slurry are formed. The droplets of slurry are contacted with a moving bed of calcium carbonate and aggregates of melamine are formed.

A mixture containing equal parts of ammonium nitrate and ammonium sulfate is slurried in ether and polyvinyl acetate is added as a binder. Droplets of the slurry are formed and contacted with small crystals of ammonium sulfate to form small attrition-resistant spheres of the slurry mixture.

We claim:
1. A process for preparing aggregates comprising
   (a) preparing a slurry, said slurry comprising a suspending liquid and distinct particles of a first solid suspended in said liquid;
   (b) preparing a particle bed consisting of particles of a second solid;
   (c) forming droplets of said slurry; and
   (d) dropping said droplets of said slurry into said particle bed under conditions where said suspending liquid is at least partially removed from the slurry droplet to form an aggregate of said distinct particles of said first solid.

2. The process of Claim 1 wherein said suspending liquid is water.

3. The process of Claim 1 wherein the first solid is a catalyst or a catalyst precursor.

4. The process of Claim 1 wherein said first solid contains at least bismuth and molybdenum.

5. The process of Claim 1 wherein the particle size of the first solid is less than about a millimeter.

6. The process of Claim 1 wherein the slurry has an apparent viscosity of about 400 to about 15,000 centipoise.

7. The process of Claim 1 wherein the particle bed is composed of particles having a size of below about 500 microns.

8. The process of Claim 1 wherein said first solid and said second solid are chemically similar.

9. The process of Claim 1 whereby an aggregate with a void center is produced.

References Cited

UNITED STATES PATENTS

| | | | |
|---|---|---|---|
| 2,736,713 | 2/1956 | Murray et al. | 252—448 |
| 2,746,934 | 5/1956 | Richardson et al. | 252—448 |
| 2,785,140 | 3/1957 | Whiteley | 252—448 |
| 2,842,194 | 7/1958 | Kearby | 252—448 |
| 2,865,868 | 12/1958 | McKinley | 117—6 |
| 2,995,773 | 8/1961 | Gidlow et al. | 117—6 |
| 3,070,837 | 1/1963 | Loertscher et al. | 117—6 |
| 3,650,961 | 3/1972 | Hudson | 117—6 |
| 3,654,186 | 4/1972 | Vesely | 252—448 |

FOREIGN PATENTS

| | | |
|---|---|---|
| 6,613,274 | 7/1973 | Netherlands. |

MICHAEL SOFOCLEOUS, Primary Examiner

U.S. Cl. X.R.

117—100 B, 100 S; 252—448, 456, 458, 469